(12) United States Patent
Kane et al.

(10) Patent No.: US 8,770,599 B1
(45) Date of Patent: Jul. 8, 2014

(54) DOLLY AND CARRY CAGE FOR DEVICE SUCH AS A TUBE CLEANING MACHINE

(76) Inventors: Timothy Kane, Greenwich, CT (US); George Cruz, Stamford, CT (US)

( * ) Notice: Subject to any disclaimer, the term of this patent is extended or adjusted under 35 U.S.C. 154(b) by 0 days.

(21) Appl. No.: 13/506,445

(22) Filed: Apr. 19, 2012

(51) Int. Cl.
*B62B 1/12* (2006.01)

(52) U.S. Cl.
USPC ................. 280/47.18; 280/47.19; 280/47.24; 280/655.1

(58) Field of Classification Search
USPC ........ 280/47.131, 47.315, 47.17–47.2, 47.24, 280/655.11, 79.11–79.3
See application file for complete search history.

(56) References Cited

U.S. PATENT DOCUMENTS 7,597,340 B2 * 10/2009 Hirose et al. ............... 280/655.1

* cited by examiner

*Primary Examiner* — Jeffrey J Restifo
*Assistant Examiner* — Erez Gurari
(74) *Attorney, Agent, or Firm* — Patrick J. Walsh

(57) ABSTRACT

A dolly and carry cage for a device with robust tubular frame for mounting machine, with a wheel and handle dolly arrangement integral with the frame for rolling the device to work site, and with a carry handle for lifting device as needed.

4 Claims, 5 Drawing Sheets

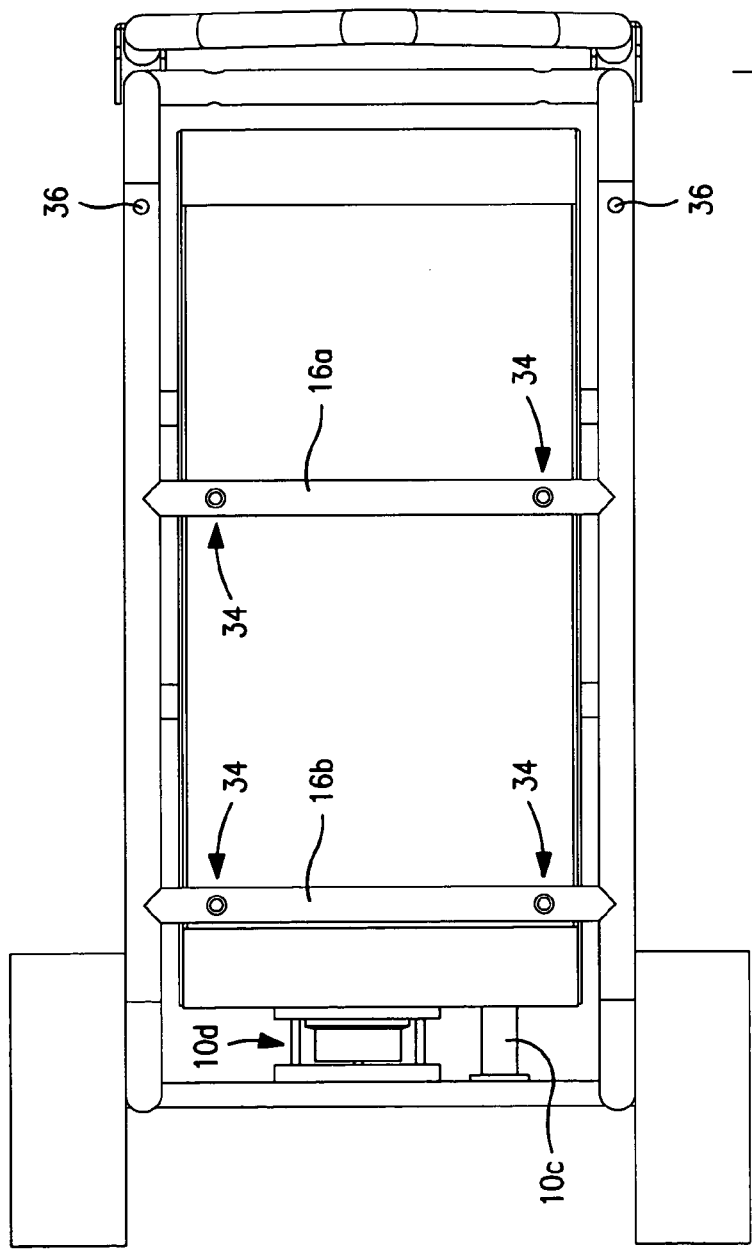
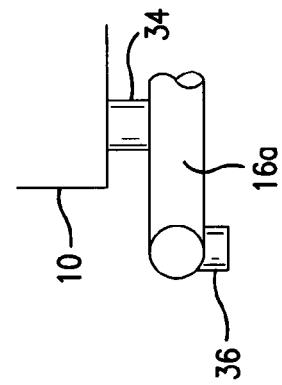
FIG. 5
FIG. 6

DOLLY AND CARRY CAGE FOR DEVICE SUCH AS A TUBE CLEANING MACHINE

BACKGROUND OF THE INVENTION

This invention relates to portable tube cleaning machines and the need for bringing the machines into position for tube cleaning in machinery spaces where heat exchangers are located.

The invention has particular application with machines for cleaning the interior of heat exchanger tubes to maintain operational efficiency. These machines have electric motor driven flexible shafts for rotating brushes or other tools which together with flushing water remove mineral deposits and dirt from the inside surfaces of the heat exchanger tubes. The machines are portable and may be fitted with a set of wheels for ease of bringing into operating position beside a heat exchanger.

The layout of power plant spaces and the size of power plant equipment often present obstacles against access to the equipment by operating and maintenance personnel such that a tube cleaning machine may be wheeled to a given point, and then must be lifted or lowered into final operating position.

To solve this problem, there is need for the dolly carry cage of the present invention.

SUMMARY OF THE INVENTION

The present invention provides mobility for portable tube cleaning machines used by power plant maintenance personnel for cleaning the tubes of heat exchangers.

The tube cleaning machine is encased in a housing with operating facilities carried on or through the housing including control panel, cleaning fluid inlet connection, electric motor driven rotary shaft, drive shaft and cleaning fluid coupling, electric power connection, foot pedal for controlling cleaning fluid flow, and a well for biocide pellets. A preferred embodiment of dolly and carry cage according to the invention for such tube cleaning machine facilitates uninhibited access to all such operating facilities.

A preferred embodiment of dolly carry cage according to the invention comprises a robust cage comprising a tubular frame of generally parallel upright side members cross-connected with tubular transverse bars at bottom, rear, and top of the side members, and with a carry grip between top transverse bars. A bottom front transverse bar may define an axis for mounting a axle and wheel subassembly at front of the frame, and a fold-away handle may be mounted at the rear of the frame for leverage using the frame as a dolly. The tube cleaning machine is preferably secured only to bottom and rear transverse bars as sole connection of machine to frame through shock absorbers so as to minimize vibratory effects of machine with its rotating operating components for tube cleaning operations.

The machine is mounted on the frame with front end of machine housing having operating facilities unobstructed by any transverse bars of the frame. A biocide well located in the top face of the machine is also unobstructed by top transverse bars.

The tube cleaning machine so mounted on the dolly carry cage can be rolled to vicinity of a tube cleaning site, and then manually lifted or lowered into final position.

Specific examples are included in the following description for purposes of clarity, but various details can be changed within the scope of the present invention.

OBJECTS OF THE INVENTION

An object of the invention is to provide a dolly carry cage for ease of moving tube cleaning machines into position in a machinery room next to a heat exchanger.

Another object of the invention is to provide a robust frame defining a dolly and a carry cage for mounting a tube cleaning machine with unimpeded access to operating facilities of the machine.

Another object of the invention is to provide a robust frame defining a dolly and a carry cage so that a tube cleaning machine can easily be moved into position next to heat exchange equipment by wheels and carry handle.

An object of the invention is to provide a dolly carry cage for mounting tube cleaning machines in a manner that dampens vibration of the machine.

Another object of the dolly and carry cage is to protect the tube cleaning machine from physical damage during use.

Other and further objects of the invention will become apparent with an understanding of the following detailed description or upon employment of the invention.

BRIEF DESCRIPTION OF THE DRAWING

A preferred embodiment of the invention has been chosen for detailed description to enable those having ordinary skill in the art to which the invention appertains to readily understand how to construct and use the invention and is shown in the accompanying drawing in which:

FIG. 5 is a bottom plan view of dolly and carry cage of FIG. 1.

FIG. 6 is a detail view of cage bottom transverse bar showing shock absorber for mounting tube cleaning machine to dolly and carry cage.

DETAILED DESCRIPTION OF THE PREFERRED EMBODIMENT

Figure 1:
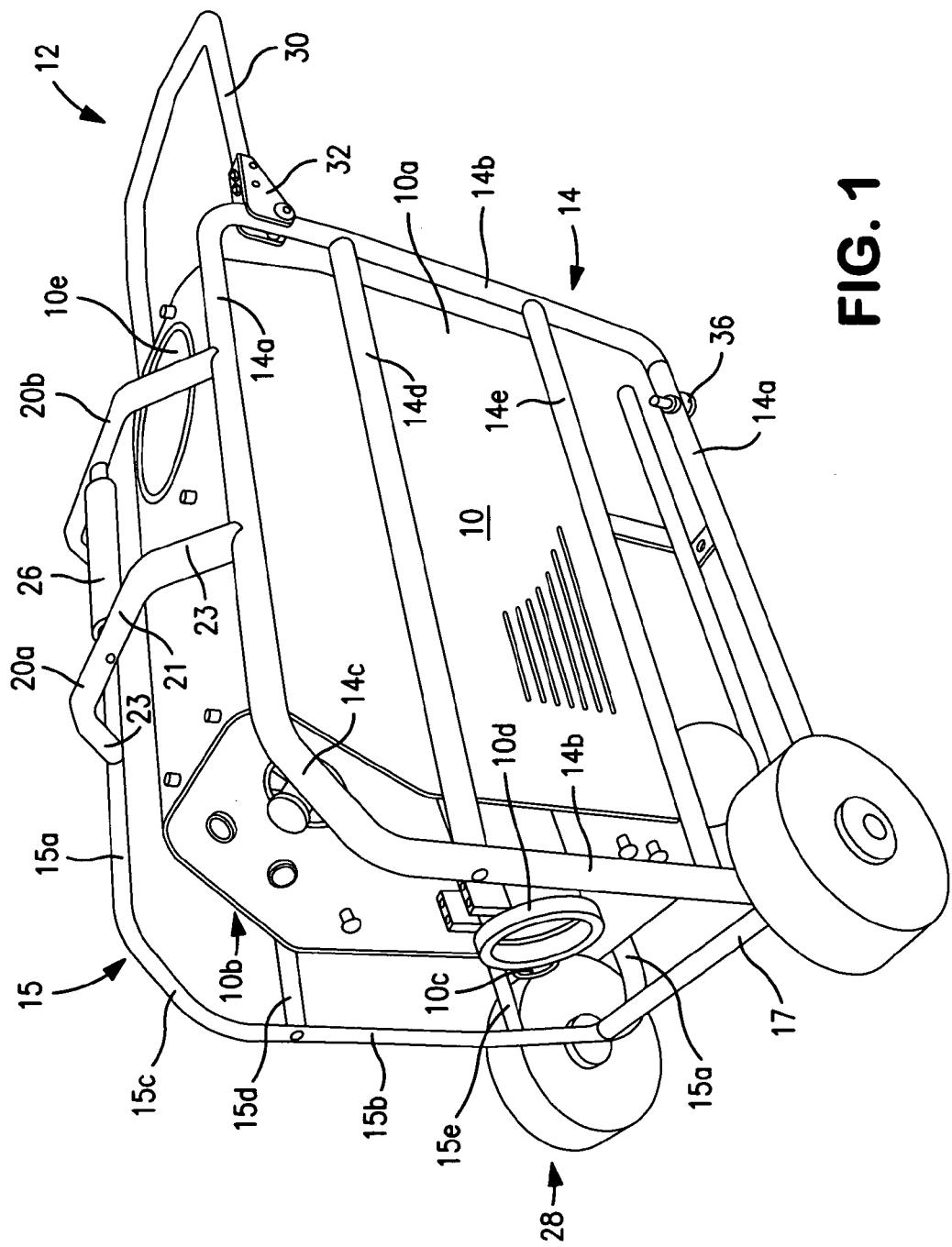
FIG. 1 is a perspective view of preferred embodiment of dolly and carry cage according to the invention showing front operating panel and rotary shaft coupling of tube cleaning machine positioned within the cage.

The dolly and carry cage of the invention is used for moving tube cleaning machines made and sold by Goodway Technologies Corporation, particularly, RAM™ tube cleaners having a power housing mounted in the cage. The housing has a coupling connected to the near end of an elongate flexible drive shaft (not shown) for rotating a tube cleaning brush or tool mounted at the far end of the flexible shaft. A sheath encasing the drive shaft defines an interior channel for passage of cleaning fluid through coupling and sheath to the brush end of the shaft. In a tube cleaning pass, the rotating tool and cleaning fluid advance through a tube interior to remove and flush away dirt and encrusted mineral. The tube cleaning machine housing has an internal drive motor (not shown) for rotating the flexible shaft.

The tube cleaning machine 10 shown in the drawing comprises machine housing 10a with operating facilities including control console 10b, cleaning fluid inlet connection 10c, rotary drive shaft and cleaning fluid coupling 10d, and well 10e for biocide pellets. A preferred embodiment of dolly and carry cage according to the invention for such tube cleaning machine facilitates unobstructed access by an operator to all such machine operating facilities. That is, none of the cage bars or stringers interfere with such access to facilities.

A preferred embodiment of dolly carry cage comprises a robust welded tubular frame 12 of generally parallel upright identical side frame members 14, 15 cross-connected with tubular transverse bars at bottom 16*a-b* (FIG. 5), front 17, rear 18*a-b* (FIG. 2), and top 20*a-b*.

Each side frame 14, 15 comprises a generally rectangular loop of horizontal 14*a*, 15*a* and vertical 14*b*, 15*b* bars with rounded corners and top front bevelled or angled corners 14*c*, 15*c*. For each side frame 14, 15 a pair of spaced horizontal stringer bars 14*d-e*, 15*d-e* extend between vertical frame bars to strengthen the side frame. The top transverse bars 20*a*, 20*b* include a central horizontal portion 21, and angled end portions 23 extending down toward and connected to side frame top horizontal bars 14*a* and 15*a*.

A carry handle 26 extends between mid-points of top transverse bars 20*a-b* for carrying the entire ensemble of cage and tube cleaning machine. The handle comprises a section of tubing secured to bars 20*a-b* and covered by a grip sleeve.

The carry frame so constructed provides a rigid structure for receiving and holding tube cleaning machine 10 for movement about a machinery space, and for tube cleaning operations. As shown in FIG. 1, there is unobstructed access to tube cleaning facilities between top transverse bar 20*a* and front bar 17. The carry frame also protects the physical integrity of machine housing in what can be a hard edge operating environment.

Figure 2:
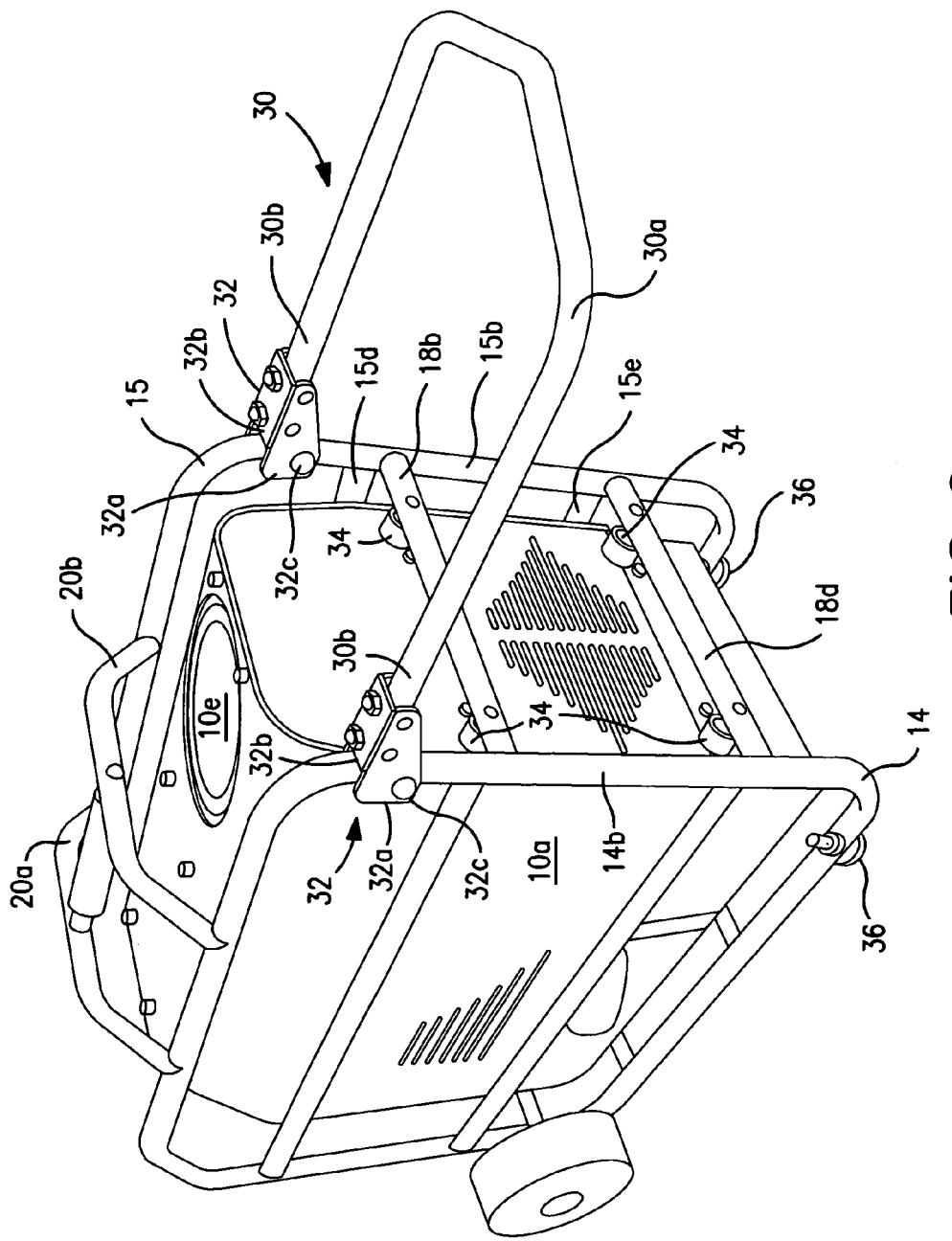
FIG. 2 is a perspective view of dolly and carry cage of FIG. 1 showing rear side with dolly handle deployed for wheeling the tube cleaning machine.
Figure 3:
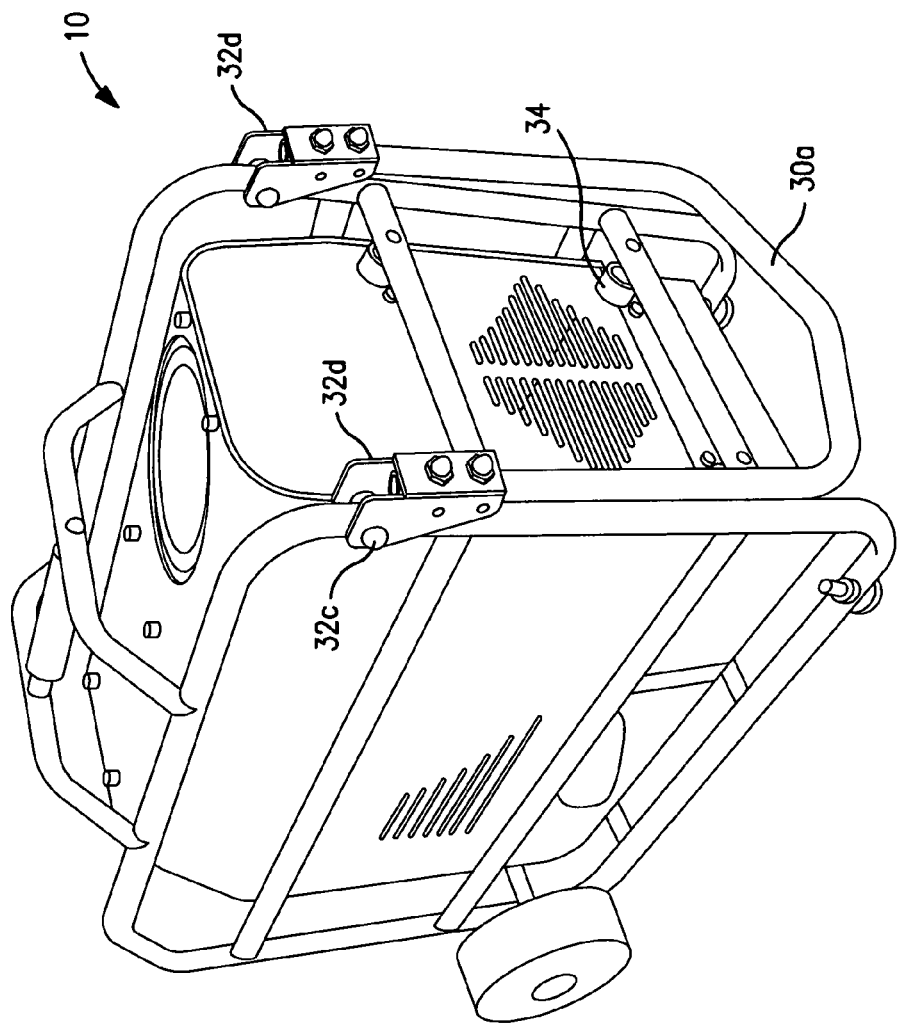
FIG. 3 is a perspective view of dolly and carry cage of FIG. 2 showing rear side with dolly handle folded away.
Figure 4:
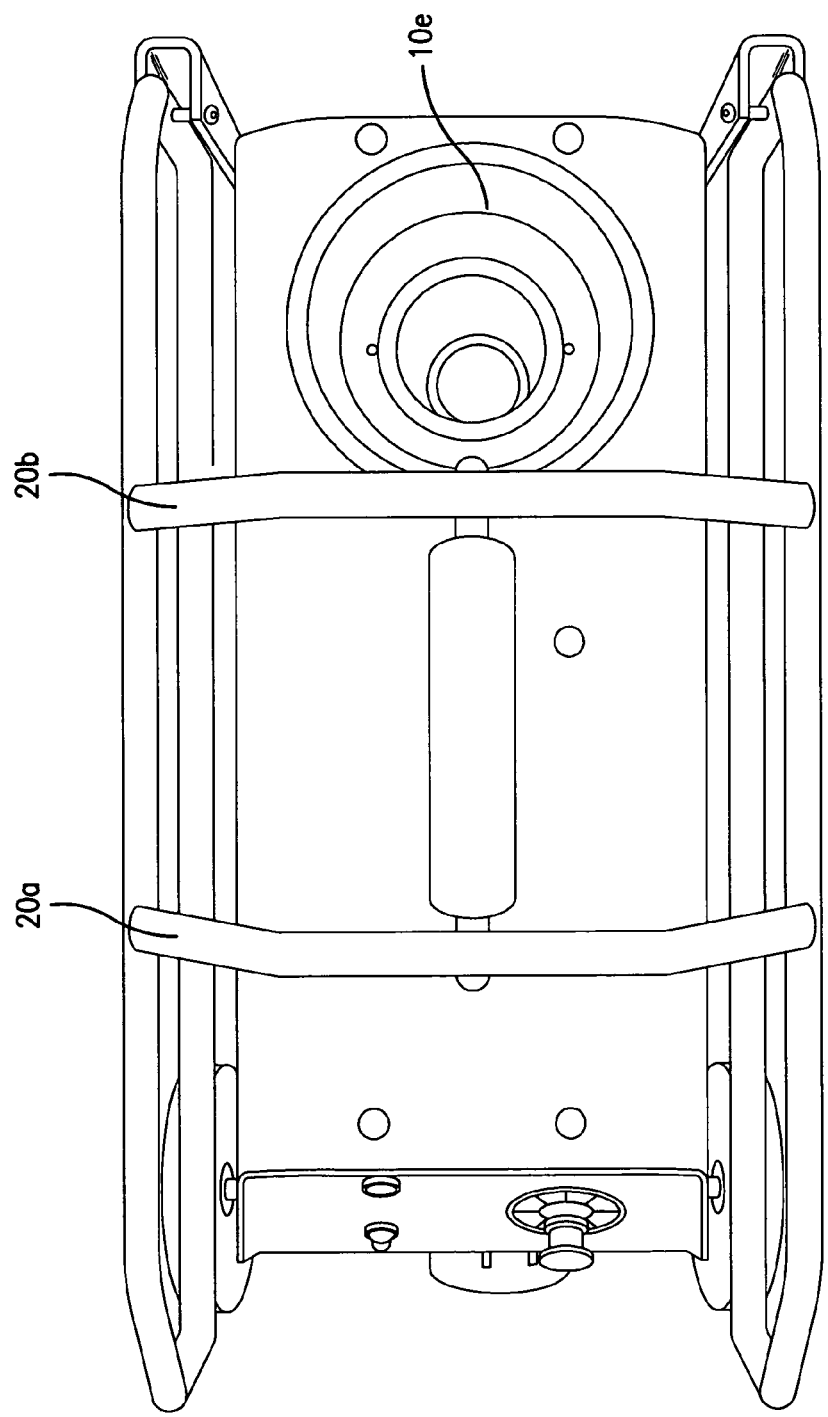
FIG. 4 is a top plan view of dolly and carry cage of FIG. 1.

A wheel and axle assembly 28 is passed through and supported by front transverse bar 17 for situating wheels 28*a* at the lower front corner of the cage. The cage in this way becomes a dolly for wheeling the tube cleaning machine in the manner of in cooperation with a handle 30 pivotally mounted to rear vertical side frame bars 14*b*, 15*b* by pivot brackets 32 (FIGS. 2 and 3).

The handle 30 comprises a U-shape bar 30*a* extending between pivot brackets 32 attached to upper reach of vertical side frame bars 14*b*, 15*b*. Brackets 32 (FIG. 2) have triangular side panels 32*a* and a top panel 32*b*. The top panel is secured by pins or bolts to a handle end 30*b*, and corners 32*c* of bracket side panels is secured to frame vertical bars 14*b*, 15*b* by pivot pin or bolt. Bracket top panel is recessed 32*d* (FIG. 3) such that when the handle is deployed to position of FIGS. 1 and 2, the handle ends engage vertical bar to enable lifting of entire frame and machine assembly as handle is lifted above horizontal.

The tube cleaning machine is preferably secured by shock absorbers 34 to bottom transverse bars 16*a*, 16*b* and to rear transverse bars 18*a* and 18*b* as sole connection of machine to frame so as to minimize vibratory effects of machine on frame during tube cleaning operations. Side frame members 14*a* and 15*a* have ground support shock absorbers 36 (FIGS. 5, 6) near the handle end of the frame.

The machine is mounted on the frame with front end of machine housing with operating facilities unobstructed by the frame any transverse ribs. There is no cage bar in the space between the top transverse bar 20*a* and front transverse bar 17 that would interfere with access to control console, water inlet connection, or shaft coupling. The biocide well located in the top face of the machine is also unobstructed by top transverse ribs.

The tube cleaning machine so mounted on the dolly carry cage can be rolled to vicinity of a tube cleaning site, and then lifted or lowered into final position.

The foregoing description focuses particularly on a tube cleaning machine being transported for industrial use, and it is to be understood that the dolly and carry cage may be used for any device in analogous use.

Various changes may be made to the structure embodying the principles of the invention. The foregoing embodiments are set forth in an illustrative and not in a limiting sense. The scope of the invention is defined by the claims appended hereto.

We claim:

1. A dolly and carry cage and a tube cleaning machine comprising:

the tube cleaning machine having a housing with a front end, the front end having machine operating facilities including a control console, cleaning fluid inlet connection, a coupling for rotary drive shaft and cleaning fluid, each of the operating facilities accessible at the front end of the machine;

the dolly and carry cage having side frame members positioned on opposite sides of the machine, each side frame member being a generally rectangular loop of horizontal and vertical bars and at least one horizontal stringer bar extending between vertical bars, the side frame members being connected to each other with transverse bars across bottom, rear, and top sides of the frame members to define a cage for receiving and supporting the machine at its bottom, a front transverse bar extending between side frame members, the front transverse bar for supporting a wheel and axle assembly passed through the bar at the front lower end of the side frame members, the machine front end having unobstructed access machine operating facilities through the dolly and carry cage between top transverse bar and front transverse bar, a pivotable dolly handle attached to the rear upper end of the side frame members for tilting the machine and cage to roll along on its wheels, pivot brackets connecting the dolly handle to side frame members, the brackets having triangular side panels and a top panel, each top panel secured handle end, corners of bracket side panels secured to frame vertical bars by pivot pins, the top panel being recessed so that when the handle is deployed to tilting position the handle ends engage vertical bar to enable tilting of entire frame and machine assembly, and a cage handle extending between top transverse bars for manually carrying the entire dolly, cage, and machine ensemble into final position for tube cleaning operations.

2. A dolly and carry cage and a tube cleaning machine as defined in claim 1 in which bottom transverse bars have shock absorbers for mounting the machine.

3. A dolly and carry cage and a tube cleaning machine as defined in claim 1 in which the rear transverse bars have shock absorbers for connection to the machine.

4. A dolly and carry cage and a tube cleaning machine as defined in claim 1 further comprising a well in the top face of the machine housing for biocide pellets, the well being unobstructed by top transverse bars.

\* \* \* \* \*